Sept. 8, 1970     O. R. WALTRIP     3,527,968
PRESSURE SEALED MAGNETOMOTIVE MOTOR
Filed July 16, 1968     3 Sheets-Sheet 1
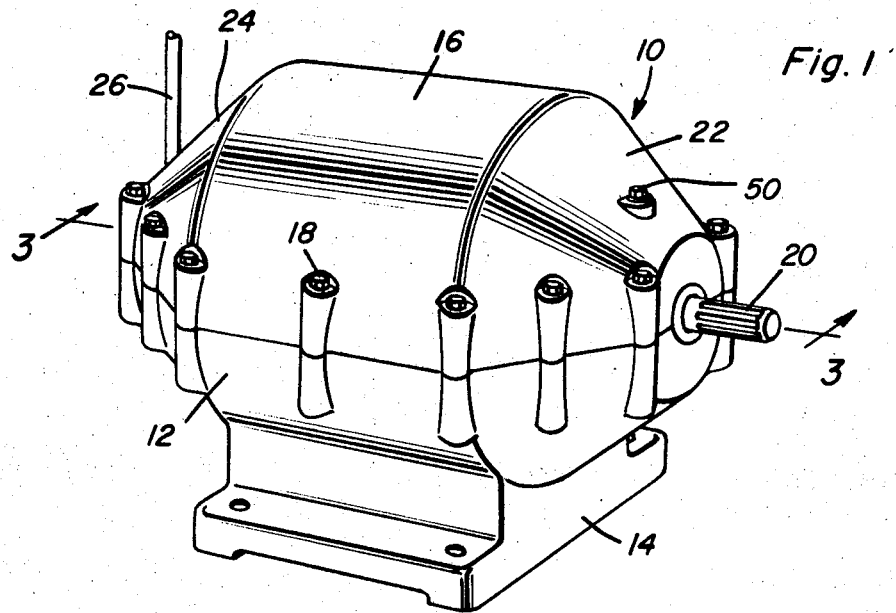
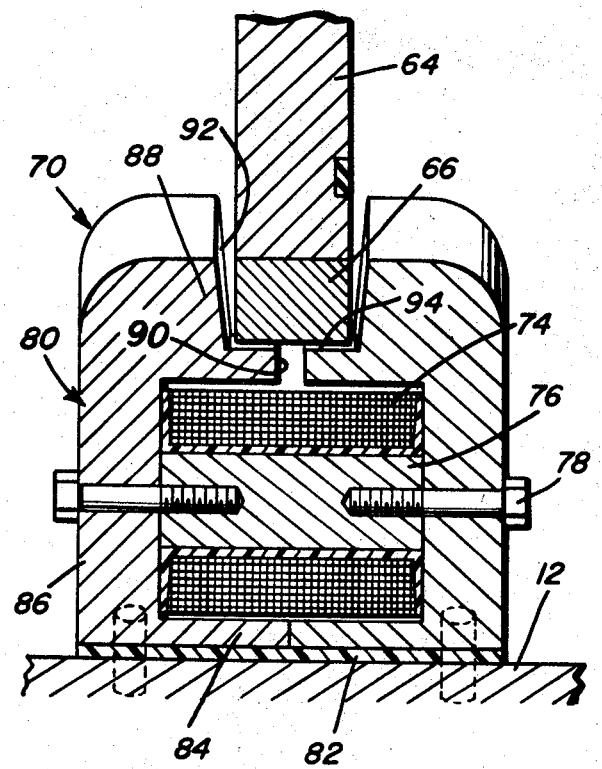
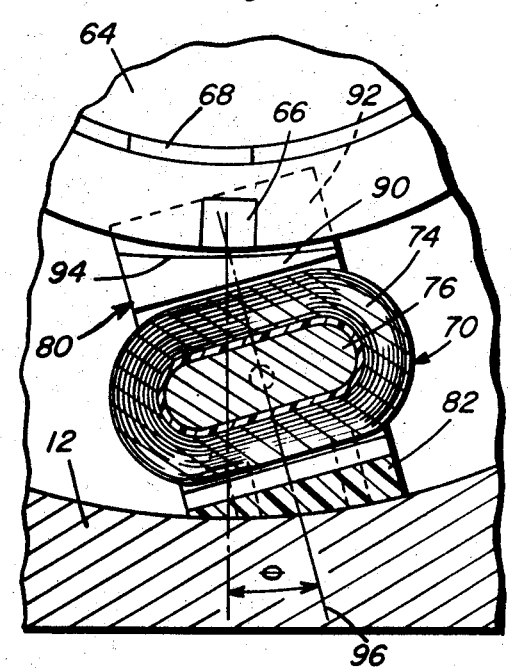
Owen R. Waltrip
INVENTOR.

Sept. 8, 1970  O. R. WALTRIP  3,527,968
PRESSURE SEALED MAGNETOMOTIVE MOTOR
Filed July 16, 1968  3 Sheets-Sheet 2

Owen R. Waltrip
INVENTOR.

BY Clarence A. O'Brien
and Harvey B. Jacobson
Attorneys

Fig. 4
Non-magnetic wheel
Soft iron points
Fig. 5
Owen R. Waltrip
INVENTOR.
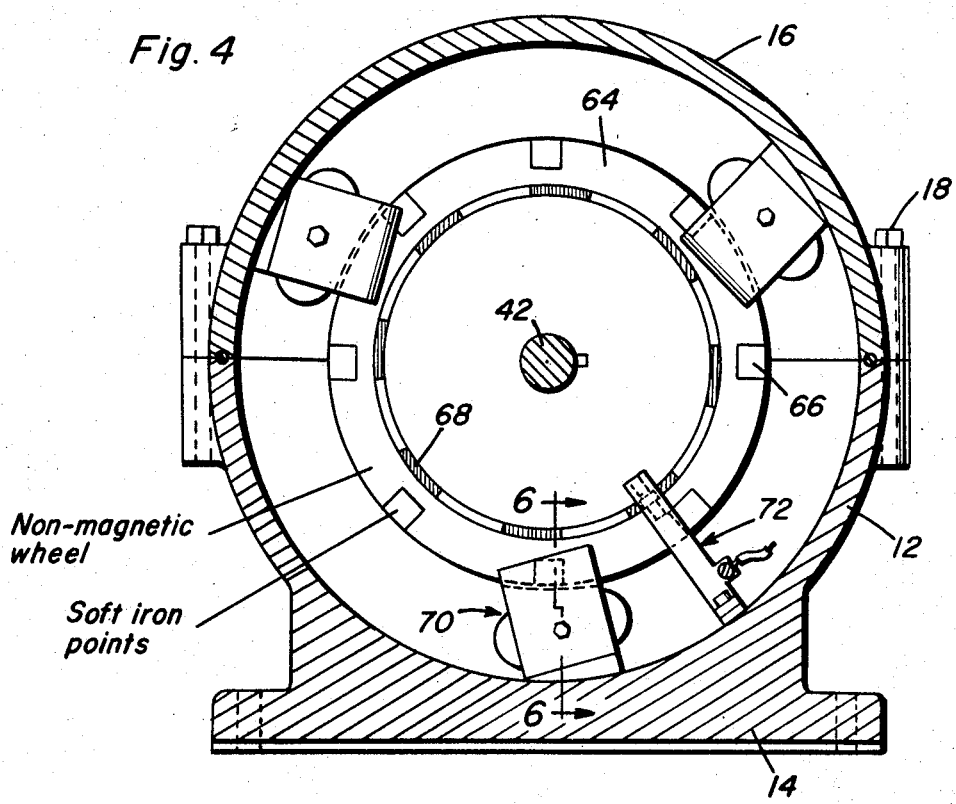
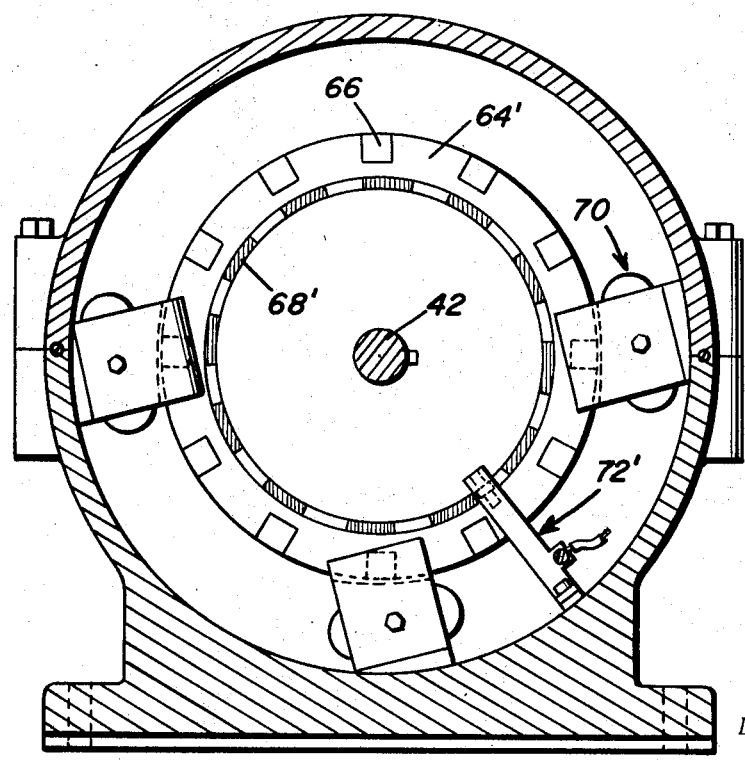

United States Patent Office 3,527,968
Patented Sept. 8, 1970

3,527,968
PRESSURE SEALED MAGNETOMOTIVE MOTOR
Owen R. Waltrip, Roseville, Calif., assignor, by direct and mesne assignments, of ten percent to Paul J. Lunardi and twenty-two and one-half percent to John Konsonlas, both of Roseville, and twenty-two and one-half percent to Coleman D. Stephen, Jr., Sacramento, Calif., and twenty-two and one-half percent to Noel Adams, Oklahoma City, Okla.
Continuation-in-part of application Ser. No. 698,058, Jan. 15, 1968. This application July 16, 1968, Ser. No. 745,235
Int. Cl. H02k 37/00
U.S. Cl. 310—49                    9 Claims

ABSTRACT OF THE DISCLOSURE

A magnetomotive arrangement in which an electromagnetic coil is intermittently energized to produce a magnetic field while a magnetic insert carried by a nonmagnetic rotor passes between the pole faces of flux conducting members associated with the coil to vary the flux gap between the pole faces and the reluctance of the magnetic flux path. The change in the magnetic field so produced involves a conversion of D.C. electrical energy to A.C. electrical energy and motive energy through motor and generator action.

---

This application is a continuation-in-part of my prior copending application U.S. Ser. No. 698,058, filed Jan. 15, 1968, now abandoned and is related to my prior copending application, U.S. Ser. No. 670,504, filed Sept. 6, 1967.

This invention relates to a magnetomotive type of converter involving an interchange between electrical, magnetic and motive energy. More particularly, the present invention relates to a novel magnetmotive arrangement producing an efficient conversion of energy.

The present invention employs electromagnetic coil assemblies of the type disclosed in my prior copending application, U.S. Ser. No. 670,504, aforementioned in order to minimize losses due to residual magnetism. Each coil is mounted on a core connected to pole piece members forming a three-sided flux gap through which the peripheral portion of a rotor passes. The rotor being made of nonmagnetic material, mounts magnetic inserts and contact strips for controlling the intermittent energization of the electromagnetic coil so as to produce a magnetic field only while the magnetic insert passes into the flux gap. The change in the magnetic field produced as a result of the movement of the magnetic insert between the pole faces, is occasioned by an interchange of energy between magnetic and motive forms enhanced because of a particular angular relationship between the pole pieces of the electromagnetic assembly and the rotor on which the magnetic insert is carried. Rotation of the rotor will therefore be accompanied by either the generation of electrical energy from the terminals of the electromagnetic coil or the application of rotational torque to the rotor upon supply of electrical energy to the electromagnetic coil.

One or more rotors may be utilized in accordance with the present invention while enclosed within a pressure sealed housing within which a vacuum is maintained in order to eliminate or minimize electrostatic drag. Electrical energy may be supplied to the electromagnetic coils to obtain converted electrical energy through a conventional type of magneto and motive energy transferred from the rotors through a fluid transmitter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical motor assembly constructed in accordance with the present invention.

FIG. 4 is a transverse sectional view taken substantially through a plane indicated by section line 4—4 in FIG. 3.

FIG. 5 is a transverse sectional view similar to FIG. 4 but showing a different stator arrangement.

FIG. 6 is an enlarged partial sectional view taken substantially through a plane indicated by section line 6—6 in FIG. 4.

FIG. 7 is an enlarged partial sectional view taken substantially through a plane indicated by section line 7—7 in FIG. 3.

Figure 2:
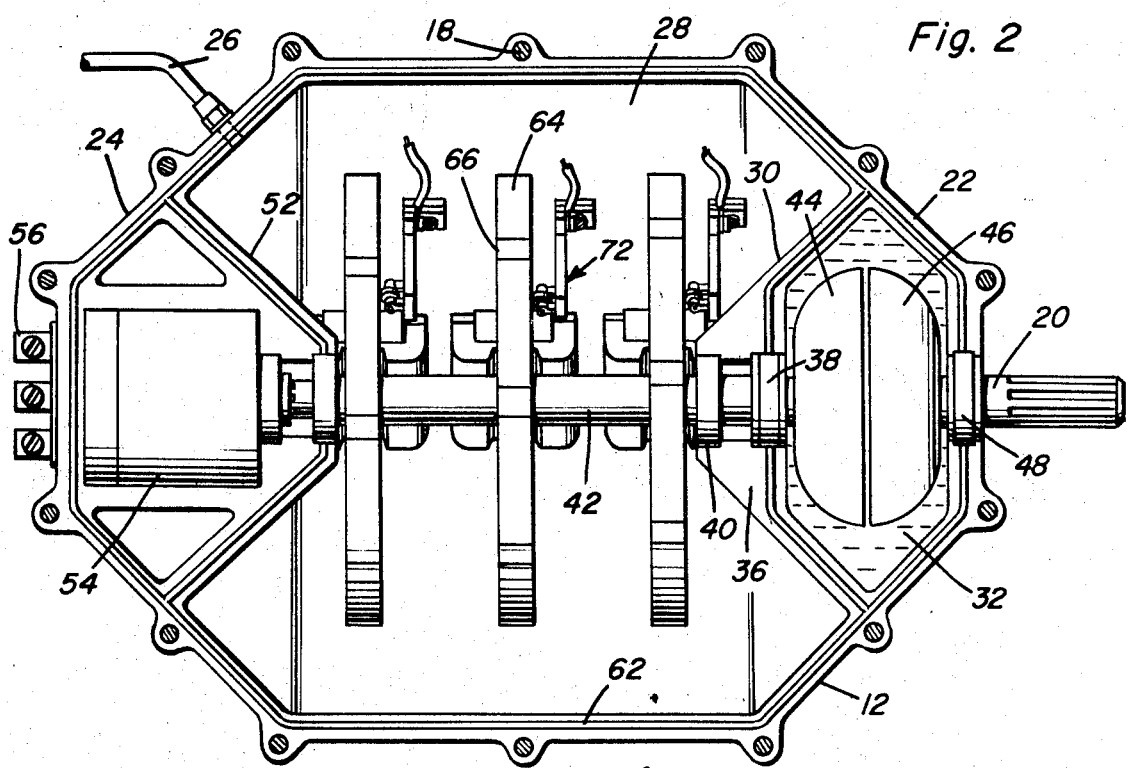
FIG. 2 is a top plan view of the motor assembly with the top section of the motor housing removed.

Referring now to the drawings in detail, FIG. 1, illustrates a motor assembly generally denoted by reference numeral 10 constructed in accordance with the present invention. The motor includes a housing having a base section 12 formed with a mounting structure 14 and a top cover section 16 secured to the base section 12 by a plurality of fastener assemblies 18. A power shaft 20 projects from one conical end portion 22 of the housing while the opposite conical end portion 24 of the housing is connected to a source of vacuum such as a vacuum pump (not shown) by means of the conduit 26.

Figure 3:
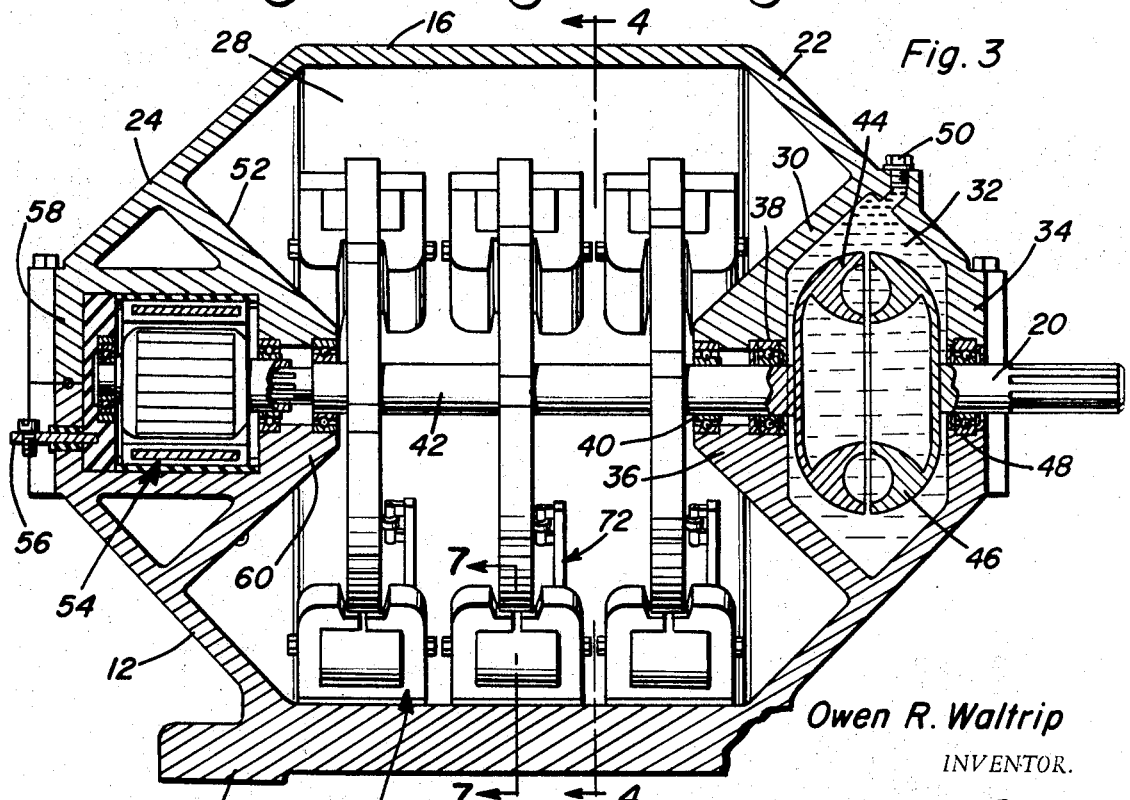
FIG. 3 is a side sectional view taken substantially through a plane indicated by section line 3—3 in FIG. 1.

Referring now to FIGS. 2 and 3, it will be observed that the housing encloses a hermetically sealed, vacuum chamber 28 axially between the conical end portions 22 and 24. The conical end portion 22 internally mounts a support structure 30 enclosing a sealed, fluid-filled chamber 32 between the end wall 34 and a bearing support portion 36. A pressure sealing bearing assembly 38 is mounted within the bearing support portion in spaced relation to the bearing assembly 40 for rotatably supporting a rotor shaft 42 to which a vaned member 44 is connected within the oil-filled enclosure 32. A second vaned coupling member 46 is enclosed in operative spaced relation to the member 44 within the enclosure 32 and is connected to the power shaft 20 journaled by the bearing assembly 48 within the end wall 34. Thus, the coupling members 44 and 46 form a fluid transmitter for transfer of motive power between the rotor shaft 42 and the power shaft 20 utilizing the fluid within the enclosure 32 as the torque transmitting medium. The enclosure 32 is maintained filled with fluid by removal of the filling plug 50 mounted in the end portion 22 of the housing.

The end portion 24 of the housing internally mounts a support structure 52 similar to the support structure 30 aforementioned. The support structure 52 encloses in pressure sealed relation to the intermediate chamber 28 of the housing, a conventional type of magneto 54 from which A.C. electrical energy may be obtained through the terminals 56 projecting from the the end wall 58. The rotor shaft 42 is splined to the armature of the magneto and is journaled within the bearing support portion 60 of the support structure by spaced bearing assemblies. Lubricating grooves 62 communicating with each of the bearings may be formed in the housing sections as shown in FIG. 2.

Referring now to FIGS. 3 and 4, it will be observed that the rotor shaft 42 mounts a rotor assembly which in the illustrated embodiment consists of three axially spaced rotor discs or wheels 64. Each rotor disc which is of similar construction is keyed to the rotor shaft 42 and is made of nonmagnetic material. A plurality of magnetic inserts 66 are peripherally carried by each of the rotor discs. As illustrated in FIG. 4, eight equally spaced inserts 66 are mounted on each rotor disc. Spaced radially inwardly from the inserts, are an equal number of circumferentially spaced conductive contact strips 68. Each rotor disc cooperates with a stator assembly consisting of a plurality of electromagnetic assemblies 70 fixedly mounted within the housing and a contact assembly 72 also fixedly mounted within the housing for engagement with the contact strips 68. As shown in FIGS. 3 and 4, each rotor disc 64 may be associated with three equally spaced electromagnetic assemblies 70 disposed 120 degrees apart relative to the rotational axis of the rotor shaft and one contact assembly 72. The contact assembly and the contact strips 68 engageable therewith are arranged to electrically connect a D.C. source of voltage to one of the electromagnetic assemblies 70 during the interval that a magnetic insert 66 is passing in operative relation to said one of the electromagnetic assemblies. In this manner, the electromagnetic assemblies 70 associated with each rotor disc are successively energized in order to impart continuous torque to the rotor disc. Other stator arrangements may of course be employed as shown for example in FIG. 5 wherein the electromagnetic assembiles 70 are arranged in 90-degree spaced relation to each other relative to the rotor shaft 42 to which a rotor disc 64' is splined having twelve inserts 66 and an equal number of contact strips 68'. The three electromagnetic assemblies 70 when arranged as shown in FIG. 5, are energized through the contact assembly 72' as three magnetic inserts 66 simultaneously pass in operative relation to the three electromagnetic assemblies. The inserts on the other rotor discs may be angularly staggered for smooth and continuous torque transmission purposes.

Referring now to FIGS. 6 and 7, it will be observed that each of the electromagnetic assemblies 70 consists of an electromagnetic coil 74 which is of a construction similar to that described in my prior copending application U.S. Ser. No. 670,504, aforementioned. The coil is mounted on a central core 76 which is secured by bolts 78 to a pair of magnetic pole pieces 80. The pole pieces 80, the core 76 as well as the magnetic inserts 66 are of course made of a magnetic material such as soft iron. The pole pieces 80 are secured in any suitable fashion to the housing sections from which they are spaced by a nonmagnetic spacer 82. The pole pieces include abutting mounting flanges 84 disposed at right angles to inwardly extending side portions 86 through which the fasteners 78 extend. On the radially inner side of the coil 74, the pole pieces are formed with confronting pole formations 88 which include more closely spaced pole face portions 90 spaced radially outwardly from the peripheral rim of the rotor disc 64 and more widely spaced pole face portions 92 which radially overlap the rotor disc and are connected to the pole face portions 90 by a curved shoulder surface 94. The pole pieces 80 extend radially inwardly from the housing sections at an angle to the radial line extending from the inserts 66 to the axis of the rotor shaft 42 as shown in FIG. 7. The curved shoulder surface 94 is arranged to be closest to the peripheral rim of the rotor disc 64 at the intersection of the radial line through the center of the insert 66 and the longitiudinal axis 96 of the electromagnetic assembly 70.

It will be apparent, that as an insert 66 approaches one of the electromagnetic assemblies 70, the coil 74 is energized in order to initially establish a magnetic field having a flux path extending through the air gap between the pole face portions 90. Since the pole face portions 92 are more widely spaced apart and are separated by the nonmagnetic rotor disc 64, there is very little flux between the pole face portions 92. This condition is however altered by movement of a magnetic insert 66 between the pole face portions 92 causing a change in the magnetic field since the insert effectively increases magnetic flux through the flux gap and reduces the reluctance of the flux path established by the pole pieces. By mounting of the pole pieces 80 at an angle such as 15 degrees to the radial line, as shown in FIG. 7, the magnetic field produced by energization of the coil 74 will exert a rotational torque on the rotor disc through the magnetic insert 66 as it enters the magnetic field until it approaches the position illustrated in FIG. 7, toward which it moves in a clockwise direction. As the insert moves past this position, it moves out of the magnetic field in such a manner that a net gain of torque occurs. It is well known that a soft iron element when brought into a magnetic field established between opposite pole faces of a magnet will experience a pull toward a location within the magnetic field at which maximum flux density exists such as the location occupied by the insert 66 in FIG. 7. Thus, the magnetomotive force of the electromagnetic assembly 70 is utilized to convert D.C. electrical energy to motive energy in the form of the invention illustrated wherein the rotor drives the magneto 54 to obtain a regulated amount of A.C. electrical energy from terminals 56. By use of a coil 74 as disclosed in my prior copending application U.S. Ser. No. 670,504 aforementioned, losses due to residual magnetism may be minimized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a magnetomotive energy converter, a rotor made of nonmagentic material, a stator, magnetic means fixedly mounted by the stator establishing a magnetic field within a flux gap having a portion radially spaced from said rotor, insert means mounted by the rotor for movement through the flux gap during rotation of the rotor, and means for varying the magnetic field within the flux gap to exert a unidirectional torque on the rotor through the insert means, said magnetic means including a magnetic core, an electro-magnetic coil mounted on the core, and a pair of pole pieces secured to the core for conducting magnetic flux, said pole pieces having confronting pole faces of opposite polarity spaced from each other to form said flux gap, said pole faces having more closely spaced portions radially spaced from the rotor and less closely spaced portions radially overlapping the rotor between which the insert means passes to form a magnetic flux path, the pole faces radially overlap the rotor by an increasing amount in one relative direction of rotation producing a varying change in the magnetic field as the insert means passes between the pole faces, said stator comprising housing means enclosing the rotor within a pressure sealed chamber, and means for establishing a vacuum within said chamber, said means for varying the magnetic field including a source of electrical energy, and means for connecting said source to the coil only while the insert means is passing between the pole faces, a magneto driven by the rotor, said housing means including axially spaced sections rotatably mounting the rotor therebetween, said magneto being mounted within one of said sections and a fluid torque transmitter connected to the rotor and enclosed within the other of said spaced sections.

2. In a magnetomotive energy converter, a rotor made of nonmagnetic material, a stator, magnetic means fixedly mounted by the stator establishing a magnetic field within a flux gap having a portion radially spaced from said rotor, insert means mounted by the rotor for movement through the flux gap during rotation of the rotor, and means for varying the magnetic field within the flux gap to exert a unidirectional torque on the rotor through the insert means, said stator comprising housing means enclosing the rotor within a pressure sealed chamber, and means for establishing a vacuum within said chamber, said means for varying the magnetic field including an electromagnetic coil, a source of electrical energy for energizing said coil and means for connecting said source to the coil only while the insert means is passing through the flux gap, a magneto driven by the rotor, said housing means including axially spaced sections rotatably mounting the rotor therebetween, said magneto being mounted within one of said sections and a fluid torque transmitter connected to the rotor and enclosed within the other said spaced sections.

3. In a magnetomotive energy converter, a rotor made of nonmagnetic material, a stator, a low magnetic reluctance insert carried by said rotor, intermittently energized coil means mounted by the stator for generating a varying magnetic field, and means for establishing a magnetic flux path from said coil means periodically extending through said insert during rotation of the rotor, said magnetic flux path establishing means including pole faces radially overlapping the rotor by a varying amount establishing flux gaps on opposite axial sides of the magnetic insert.

4. The combination of claim 3 wherein said pole faces having more closely spaced portions radially spaced from the rotor and less closely spaced portions radially overlapping the rotor between which the insert passes to form a magnetic flux path.

5. The combination of claim 4 wherein said stator comprises housing means enclosing the rotor within a pressure sealed chamber, and means for establishing a vacuum within said chamber.

6. The combination of claim 5 including a magneto driven by the rotor.

7. The combination of claim 3 wherein said stator comprises housing means enclosing the rotor within a pressure sealed chamber, and means for establishing a vacuum within said chamber.

8. The combination of claim 3 including a magneto driven by the rotor.

9. In a magnetomotive energy converter, a rotor, housing means having axially spaced sections rotatably mounting the rotor therebetween, a magneto mounted within one of said sections and drivingly connected to the rotor, and a fluid torque transmitter connected to the rotor and enclosed within the other of the spaced sections of the housing means.

References Cited

UNITED STATES PATENTS

| Re. 22,549 | 9/1944 | Plensler | 310—82 |
| 2,230,878 | 2/1941 | Bohli | 310—268 |
| 2,623,187 | 12/1952 | Adams | 310—154 |
| 2,931,927 | 4/1960 | McAdam | 310—88 |
| 2,993,159 | 7/1961 | Devol | 310—46 |
| 3,067,690 | 12/1962 | Kramer | 310—88 |
| 3,274,409 | 9/1966 | Henninger | 310—46 |
| 3,287,676 | 11/1966 | Davis | 310—154 |
| 3,331,973 | 7/1967 | McClure | 310—46 |

WARREN E. RAY, Primary Examiner

R. SKUDY, Assistant Examiner

U.S. Cl. X.R.

310—89, 181